Nov. 21, 1939.   W. H. BASELT   2,181,041
FREIGHT CAR BRAKE
Filed May 7, 1938   2 Sheets-Sheet 1
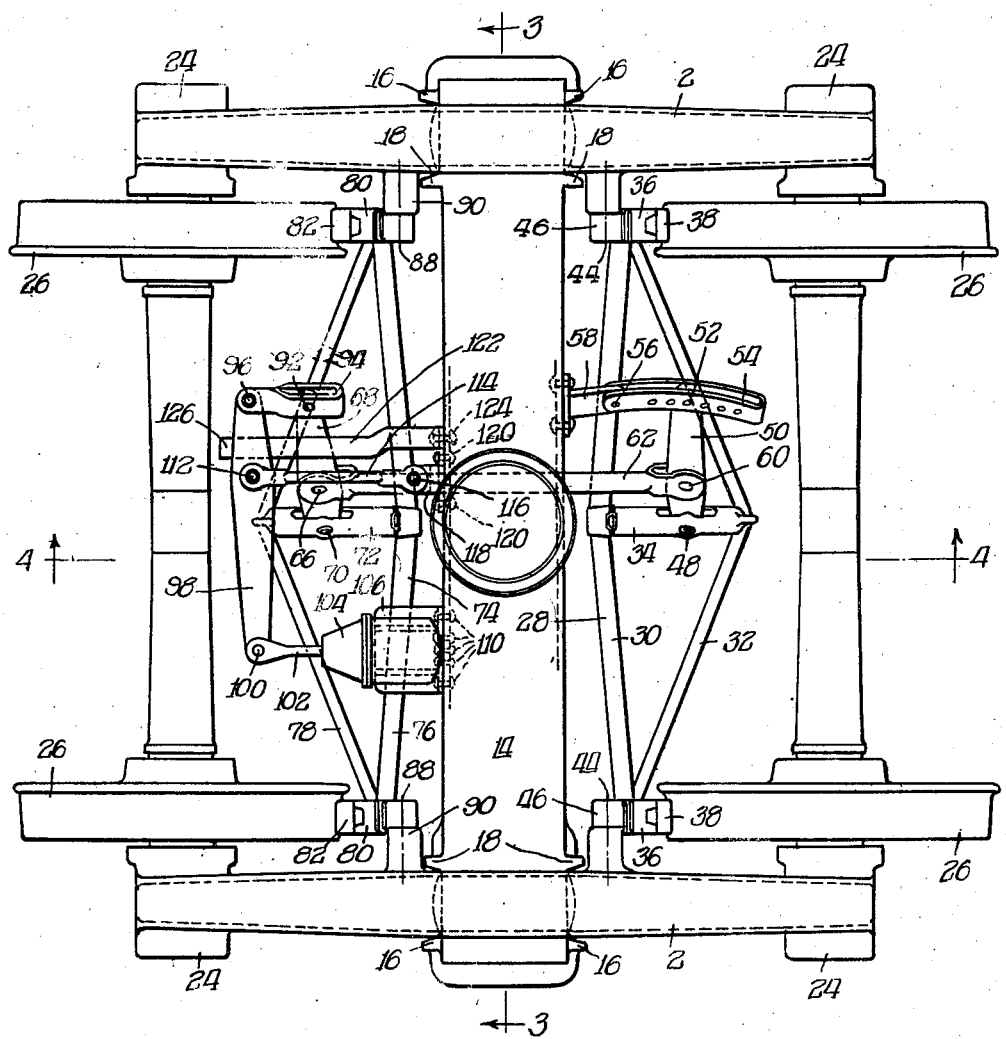
INVENTOR.
Walter H. Baselt,
BY
ATTORNEY.

Nov. 21, 1939.　　　W. H. BASELT　　　2,181,041
FREIGHT CAR BRAKE
Filed May 7, 1938　　　2 Sheets-Sheet 2
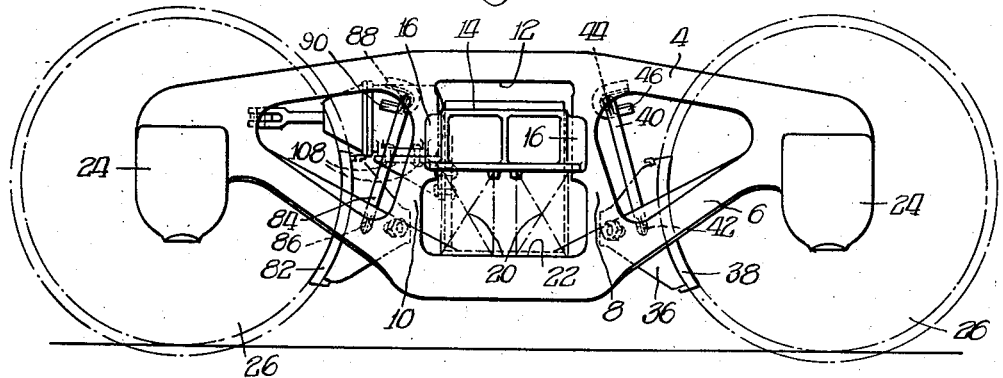
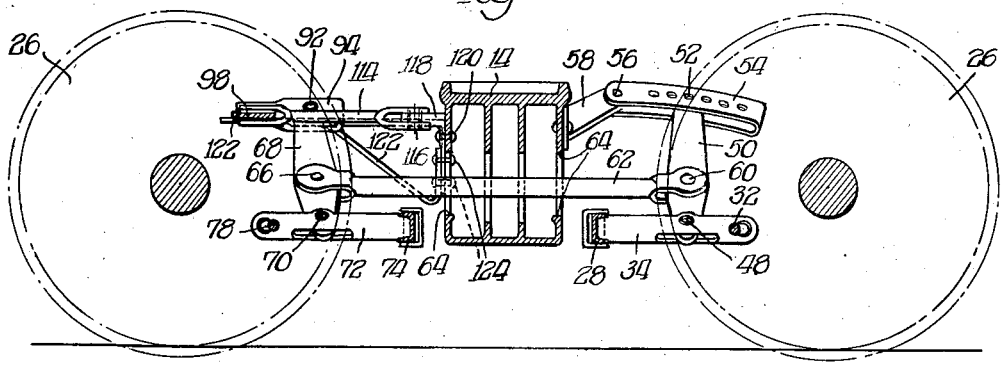
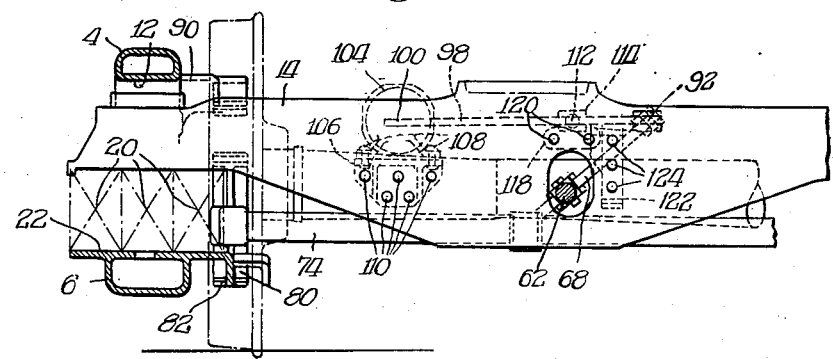
INVENTOR.
Walter H Baselt,
BY
ATTORNEY.

Patented Nov. 21, 1939

2,181,041

UNITED STATES PATENT OFFICE 2,181,041

FREIGHT CAR BRAKE

Walter H. Baselt, Chicago, Ill., assignor to American Steel Foundries, Chicago, Ill., a corporation of New Jersey Application May 7, 1938, Serial No. 206,503

22 Claims. (Cl. 188—52)

My invention relates to railway brake rigging and more particularly to a brake arrangement suitable for what is commonly known as four wheel railway freight car trucks. Such trucks commonly comprise spaced cast steel side frames of truss type joined by a cast steel bolster of box section.

An object of my invention is to provide a simple type of brake rigging for such a truck wherein power means will be mounted in the truck proper, thus eliminating the connection to the car body commonly availed of for supporting the power means.

A further object of my invention is to design such a rigging wherein the power means will be mounted on the bolster or load carrying member and wherein the brake rigging for one end of the truck will be operatively connected to the brake rigging at the opposite end of the truck by a compression member extending through said bolster.

Figure 1 is a top plan view of a railway truck and brake rigging embodying my invention;

Figure 2 is a side elevation of the truck and brake rigging shown in Figure 1;

Figure 3 is a sectional view taken substantially in the vertical plane bisecting the truck transversely as indicated by the line 3—3 of Figure 1; and Figure 4 is a longitudinal sectional view taken substantially in the vertical plane as indicated by the line 4—4 of Figure 1.

Describing my novel brake arrangement in detail, the truck comprises the spaced side frames 2, 2, each side frame having the compression member 4 and the tension member 6 with the integrally formed spaced columns 8 and 10 forming therebetween the bolster opening 12 within which may be received the end of the bolster 14, said bolster having the outer guide lugs 16, 16 and the inner guide lugs 18, 18 cooperating with the columns of the side frame in the usual manner. The lower part of the window opening 12 is relatively wide in order that the bolster end may be inserted therein and thereafter raised to its operative position wherein it may be seated on the resilient means or springs diagrammatically indicated at 20, 20, said springs being positioned on the central or spring seat portion of the tension member as indicated at 22.

The compression and tension members converge adjacent their ends to merge with the integrally formed journal boxes 24, 24, said boxes forming the usual means of connection to the journal ends of the wheel and axle assemblies 26, 26.

The brake rigging comprises the beam 28 at one end of the truck having the compression member 30, the tension member 32 and the central strut or fulcrum 34, said beam carrying at its opposite ends the brake heads 36, 36 with the associated brake shoes 38, 38. Support for the beam is provided by the hangers 40, 40 which are pivotally connected as at 42, 42 to the brake heads 36, said hangers being pivotally supported at their upper ends as at 44, 44 from the brake hanger brackets 46, 46 integrally formed on the inner faces of the side frames adjacent the junctures of the side frame columns with the compression members thereof. Pivotally connected as at 48, intermediate the ends of the fulcrum 34, is the lower end of the dead truck lever 50, the upper end thereof having a pivotal and adjustable connection as at 52 with the strap 54, the open end of said strap having a pivotal connection as at 56 to the fulcrum bracket 58 integrally formed with the bolster or otherwise secured thereto. Intermediate the ends of the dead truck lever 50 is pivotally connected as at 60 the compression bar 62, said compression bar extending through the opening 64 provided in the spaced walls of the bolster for that purpose. The opposite end of the compression rod 62 has a pivotal connection as at 66 to the live truck lever 68 and the lower end of said lever has a pivotal connection as at 70 to a point intermediate the ends of the fulcrum 72 forming a part of the truss type beam 74, said beam also having the compression member 76 and the tension member 78. The beam 74 carries at its opposite ends the brake heads 80, 80 with the associated shoes 82, 82 and support is provided therefor in the form of the hangers 84, 84, said hangers having pivotal connections at their lower ends as at 86, 86 with the brake heads 80, 80 and being pivotally supported at their upper ends as at 88, 88 from the brackets 90, 90 integrally formed on the inner faces of the side frames. The upper end of the live truck lever 68 has a pivotal connection as at 92 to the loop strap 94, said strap having a pivotal connection as at 96 to the cylinder lever 98, the opposite end of said cylinder lever having a pivotal connection as at 100 to the piston rod 102 associated with the cylinder or power means 104 which is carried on the bracket 106 and secured thereto as by the rivets 108, 108. The bracket 106 is carried on the bolster or load carrying member and may be secured thereto as by rivet means indicated at 110, 110. Intermediate the ends of the cylinder lever 98 as at 112 is pivotally connected one end of the pull rod 114, the opposite end of said pull rod having a pivotal connection as at 116 to the bracket 118 secured on the side of the bolster and riveted thereto as at 120, 120. Support means for the cylinder lever 98 is provided in the form of the strap 122 which is secured to the side of the bolster as at 124, 124 and extends outwardly therefrom to underlie said cylinder lever 98 as at 126.

In operation, assuming the parts to be in released position, actuation of the power means 104 causes the piston 102 to move to the left as seen in Figure 1, thus rotating the cylinder lever in a clockwise direction about the pivot 112 intermediate its ends and through the strap 94 causing the live truck lever 68 to rotate in a clockwise direction (Figure 1) about the fulcrum 66 intermediate its ends, thus moving the brake beam 74 to the left and bringing the brake shoes 82, 82 into engagement with the peripheries of the adjacent wheels. Continued actuation of the power means causes the live truck lever 68 to rotate in a clockwise direction about the fulcrum 70 at its lower end, thus moving the compression rod 62 to the right and causing counter-clockwise rotation of the dead truck lever 50 (Figure 1) about the fulcrum 52 at its upper end, thus moving the beam 28 to the right and bringing the brake shoes 38, 38 into engagement with the peripheries of the wheels at the opposite end of the truck. Release of the power means causes the parts to move in reverse directions, thus releasing the brakes. It will be understood of course that the beams operate substantially simultaneously and not successively as described for the purposes of clarity.

One of the specific advantages of this brake arrangement is that the brake forces acting upon the truck bolster are so positioned that they balance and do not cause undesirable rotation or turning of the bolster in the truck during a brake application.

This feature can best be illustrated by referring to Figure 1 where it will be noted that the power developed by the brake cylinder 104 acts to the left at 100, while its reaction on the truck bolster is to the right at 110. The second of these forces which acts toward the left at the cylinder lever fulcrum bracket 118, would tend to rotate the bolster in a counter-clockwise direction about 110 as a center were it not counterbalanced by the force acting toward the left at dead lever fulcrum 58.

The bolster, therefore, can be considered to be in static equilibrium under the action of forces at 110, 118 and 58, and, therefore, cannot rotate in a horizontal plane.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

1. In a four wheel spring plankless freight car truck, spaced side frames, a load carrying member extending therebetween, power means and fulcrum means mounted on said load carrying member on one side thereof; and brake rigging comprising brake hangers supporting truss type beams intermediate the wheels, each of said beams having a compression member, a tension member and a central strut, and operating means comprising a dead cylinder lever connected at one end to the piston of said power means and connected intermediate its ends to said fulcrum, the opposite end of said cylinder lever having a connection to the upper end of a live truck lever, said truck lever having its lower end connected to one of said struts and a point intermediate its ends connected to a compression bar, said compression bar extending through said load carrying member and having its opposite end connected to a dead truck lever, said dead truck lever having its lower end connected to the other of said struts and its upper end pivotally fulcrumed from the opposite side of said load carrying member, the connections of the said several parts of said rigging to said load carrying member being so positioned relative to each other that the composition of forces therefrom is substantially balanced so that said load carrying member is in substantially static equilibrium with respect to said forces.

2. In a four wheel spring plankless freight car truck, spaced side frames, a bolster extending therebetween, power means and a plurality of fulcrum means mounted on said bolster, brake rigging comprising hangers supporting truss type beams intermediate the wheels, each of said beams including a central strut, live and dead truck levers having their lower ends connected respectively to said struts and points intermediate their ends connected by a compression bar extending through said bolster, said dead truck lever having its upper end connected to one of said fulcrum means and said live truck lever having its upper end connected to one end of a cylinder lever, said cylinder lever having its opposite end connected to said power means and a point intermediate its ends connected to the other of said fulcrums, the several connections to said cylinder, said cylinder lever fulcrum and said dead truck lever to said bolster being so positioned thereon that the forces thereof substantially counter-balance each other whereby said bolster may be in static equilibrium with respect thereto.

3. In a freight car truck, spaced side frames, a connecting bolster, supporting wheel and axle assemblies, and brake rigging comprising hangers supporting a beam for each assembly, live and dead truck levers having their lower ends connected respectively to said beams centrally thereof, a compression bar extending through said bolster and connected at its opposite ends to said truck levers, said dead truck lever being fulcrumed from said bolster adjacent one end thereof, power means mounted on said bolster adjacent the opposite end thereof, and an operative connection between said power means and said live truck lever, said operative connection comprising a dead cylinder lever fulcrumed from said bolster and connected respectively to said live truck lever and to said power means, the several connections of said cylinder, said cylinder lever fulcrum and said dead truck lever to said bolster being so positioned thereon that the forces thereof substantially counter-balance each other whereby said bolster may be in static equilibrium with respect thereto.

4. In a four wheel freight car truck, spaced side frames and a connecting load carrying member, power means mounted on said load carrying member, brake rigging including brake beams supported intermediate the wheels, each of said beams having a central strut, and live and dead truck levers having their lower ends pivotally connected to said struts respectively and points intermediate their ends connected to each other, said dead truck lever having at its upper end an adjustable fulcrum connection to said load carrying member and said live truck lever being connected at its upper end to a cylinder lever, said cylinder lever being fulcrumed intermediate its ends from said load carrying member and having its opposite end connected to said power means, the several connections of said cylinder, said cylinder lever fulcrum and said dead truck lever to said load carrying member being so positioned thereon that the forces thereof substantially counter-balance each other whereby said load carrying member may be in static equilibrium with respect thereto.

5. In a freight car truck, spaced side frames, a connecting bolster, supporting wheel and axle assemblies, and brake rigging comprising beams hung from said frames intermediate the wheels, live and dead cylinder levers having a compression bar connected intermediate their ends and connected at their lower ends respectively to said beams, said dead truck lever being adjustably fulcrumed from one side of said bolster and operating means for said live truck lever in the form of power means mounted on the opposite side of said bolster, a dead cylinder lever fulcrumed from said bolster and interconnected between said power means and said live truck lever, and means on said bolster providing sliding support for said cylinder lever, the several connections of said cylinder, said cylinder lever fulcrum and said dead truck lever to said bolster being so positioned thereon that the forces thereof substantially counterbalance each other whereby said bolster may be in static equilibrium with respect thereto.

6. In a spring plankless freight car truck, spaced side frames, a connecting bolster, power means on said bolster, supporting wheel and axle assemblies, beams supported from said frames intermediate the wheels, live and dead truck levers connected to each other and connected at their lower ends respectively to said beams centrally thereof, said dead truck lever being adjustably fulcrumed from said bolster at one side thereof, a cylinder lever fulcrumed intermediate its ends from said bolster at the opposite side thereof, said cylinder lever having its opposite ends connected respectively to said live truck lever and said power means, and means on said bolster providing slidable support for said cylinder lever, the several connections of said cylinder, said cylinder lever fulcrum and said dead truck lever to said bolster being so positioned thereon that the forces thereof substantially counterbalance each other whereby said bolster may be in static equilibrium with respect thereto.

7. In a four wheel railway car truck, spaced side frames and an interconnecting bolster, power means on said bolster, brake beams supported from said frames intermediate the wheels, each of said beams having a central strut, live and dead truck levers having their lower ends connected respectively to said struts, and a compression bar extending through said bolster and connected at its opposite ends to points intermediate the ends of said truck levers, said dead truck lever being adjustably fulcrumed at its upper end from said bolster and said live truck lever having a connection to one end of a cylinder lever, said cylinder lever being fulcrumed intermediate its ends from said bolster and connected at its opposite end to said power means, the connections of said power means, said dead truck lever and said cylinder lever with said bolster being so positioned with respect to each other as to provide a substantial equilibrium of forces therefrom.

8. In a spring plankless four wheel freight car truck, spaced side frames, an interconnecting bolster, supporting wheel and axle assemblies, beams supported intermediate the wheels and having central struts, power means on said bolster, live and dead truck levers connected at their lower ends to said struts respectively and connected to each other intermediate their ends, said dead truck lever being adjustably fulcrumed from said bolster, and an operative connection between said power means and said live truck lever, said operative connection comprising a horizontal cylinder lever fulcrumed from said bolster, and means mounted on said bolster providing the slidable suport for said cylinder lever, the connections of said power means, said dead truck lever and said cylinder lever with said bolster being so positioned with respect to each other as to provide a substantial equilibrium of forces therefrom whereby said forces can not operate to rotate said bolster.

9. In a four wheel freight car truck, spaced side frames and a connecting bolster, truss type brake beams supported intermediate the wheels, each of said beams having a central strut, live and dead truck levers connected respectively to said struts, a compression bar extending through said bolster and interconnecting said truck levers, said dead truck lever having an adjustable fulcrum to said bolster and said live truck lever having an end connected to one end of a cylinder lever, said cylinder lever having a point intermediate its ends fulcrumed from said bolster, and operating means mounted on said bolster and connected to the opposite end of said cylinder lever, the connections of said bolster with said dead truck lever, said cylinder lever and said operating means being so positioned with respect to each other as to provide a substantially balanced composition of forces therefrom.

10. In a four wheel car truck, side frames, a connecting bolster, brake rigging comprising beams supported intermediate the wheels, live and dead truck levers connected to said beams respectively, a connection between said truck levers, said dead truck lever having an adjustable fulcrum from said bolster, power means mounted on said bolster, and an operative connection between said power means and said live truck lever, said operative connection comprising a dead cylinder lever fulcrumed from said bolster and having its opposite ends connected respectively to said power means and said live truck lever, the connections of said bolster with said dead truck lever, said cylinder lever and said operating means being so positioned with respect to each other as to provide a substantially balanced composition of forces therefrom whereby said bolster is in substantially static equilibrium with respect to said forces.

11. In a freight car truck, spaced side frames, a connecting bolster, power means on said bolster, supporting wheel and axle assemblies, beams supported from said frames intermediate the wheels, live and dead truck levers connected to each other and connected at their lower ends respectively to said beams centrally thereof, said dead truck lever being adjustably fulcrumed from said bolster at one side thereof, and a cylinder lever fulcrumed intermediate its ends from said bolster at the opposite side thereof, said cylinder lever having its opposite ends connected respectively to said live truck lever and said power means, the fulcrum of said cylinder lever off said bolster being intermediate the connections of said bolster with said dead lever and said power means whereby the composition of forces therebetween results in substantial equilibrium of said bolster.

12. In a freight car truck, spaced side frames, a connecting bolster, supporting wheel and axle assemblies, and brake rigging comprising beams hung from said frames intermediate the wheels, live and dead truck levers having a compression bar connected intermediate their ends and connected at their lower ends respectively to said beams, said dead truck lever being adjustably fulcrumed from one side of said bolster and operating means for said live truck lever in the form of power means mounted on the opposite side of said bolster, and a dead cylinder lever fulcrumed off said bolster and interconnected between said power means and said live truck lever, the fulcrum of said cylinder lever off said bolster being intermediate the connections of said bolster with said dead lever and said power means whereby the composition of forces therebetween results in substantial equilibrium of said bolster.

13. In a freight car truck, spaced side frames, a connecting bolster, supporting wheel and axle assemblies, and brake rigging comprising hangers supporting a beam for each assembly, live and dead truck levers having their lower ends connected respectively to said beams, a compression bar extending through said bolster and connected at its opposite ends to said truck levers, said dead truck lever being fulcrumed from said bolster adjacent one end thereof, power means mounted on said bolster adjacent the opposite end thereof, and an operative connection between said power means and said live truck lever in the form of a cylinder lever fulcrumed from said bolster intermediate the points of connection of said dead truck lever and said power means with said bolster, whereby the composition of forces resulting from operation of said power means in actuation of said rigging is substantially balanced with respect to said bolster.

14. In a four wheel freight car truck, spaced side frames and a connecting bolster, brake beams supported intermediate the wheels, each of said beams having a central strut, live and dead truck levers connected respectively to said struts, a compression bar extending through said bolster and interconnecting said truck levers, said dead truck lever having an adjustable fulcrum to said bolster and said live truck lever being connected to a dead cylinder lever fulcrumed from said bolster, and operating means mounted on said bolster and connected to said cylinder lever, the connections of said cylinder lever, said operating means and said truck lever to said bolster being so positioned as to provide substantially static equilibrium of forces therebetween.

15. In a freight car truck, spaced side frames, an interconnecting bolster, power means on said bolster, and brake rigging including beams supported intermediate the wheels and comprising central struts, live and dead truck levers connected to said struts respectively, and a compression bar interconnecting said truck levers and extending through said bolster, said dead truck lever being fulcrumed from said bolster and said live truck lever having its upper end connected to a dead cylinder lever pivoted from said bolster, the opposite end of said cylinder lever being connected to said power means, the connections of said various parts to said bolster being so positioned with respect to each other as to provide a substantial equilibrium of forces therebetween.

16. In a freight car truck, spaced side frames and an interconnecting bolster, power means on said bolster, brake beams supported from said frames intermediate the wheels, live and dead truck levers having their lower ends connected respectively to said beams and points intermediate their ends connected to each other, said dead truck lever being adjustably fulcrumed from one side of said bolster and said live truck lever having its upper end connected to a dead cylinder lever fulcrumed from said bolster, and a connection between said cylinder lever and said power means, the connections of said various parts to said bolster being so positioned with respect to each other as to provide a substantial equilibrium of forces therebetween.

17. In a spring plankless four wheel car truck, side frames, a connecting bolster, brake rigging comprising beams supported intermediate the wheels, live and dead truck levers connected to said beams respectively, a connection between said truck levers, said dead truck lever having an adjustable fulcrum from said bolster, power means mounted on said bolster, and an operative connection between said power means and said live truck lever, said operative connection comprising a cylinder lever fulcrumed from said bolster and connected respectively to said power means and to said live truck lever, said cylinder lever fulcrum being positioned on said bolster between said adjustable fulcrum and said power means in a position to afford substantially static equilibrium for said bolster with respect to the forces developed in actuation of said brake rigging.

18. In a four wheel car truck, side frames, a connecting bolster, brake rigging comprising beams supported intermediate the wheels, live and dead truck levers connected to said beams respectively, a connection between said truck levers, said dead truck lever having an adjustable fulcrum from said bolster, power means mounted on said bolster, and an operative connection between said power means and said live truck lever, said operative connection comprising a dead cylinder lever fulcrumed from said bolster the various connections of parts associated with said brake rigging to said bolster being so related with respect to each other as to afford a substantially static equilibrium for said bolster with respect to the forces developed by actuation of said power means.

19. In a four wheel freight car truck, spaced side frames, an interconnecting bolster, supporting wheel and axle assemblies, beams supported intermediate the wheels and having central struts, power means on said bolster, live and dead truck levers connected at their lower ends to said struts respectively and connected to each other intermediate their ends, said dead truck lever being adjustably fulcrumed from said bolster, and an operative connection between said power means and said live truck lever in the form of a cylinder lever pivoted from said bolster, the connections of said cylinder lever, said dead truck lever and said power means with said bolster affording a substantially balanced equilibrium of forces developed by actuation of said power means.

20. In a four wheel car truck, side frames, a connecting bolster, brake rigging comprising beams supported intermediate the wheels, live and dead truck levers connected to said beams respectively, a connection between said truck levers, said dead truck lever having an adjustable fulcrum from said bolster, and power means mounted on said bolster and operatively connected to said live truck lever through the medium of a cylinder lever fulcrumed from said bolster, the connections of said cylinder lever, said dead truck lever and said power means with said bolster affording a substantially static composition of forces with respect to said bolster as said power means is actuated.

21. In a railway truck, side members, a spring supported transverse member, supporting wheel and axle assemblies, and braking means for said wheels comprising brake beams supported from said side members on opposite sides of said transverse member, power means supported on said transverse member, and a system of levers fulcrumed from said transverse member and interconnecting said brake beams and said power means, the connections of said power means and lever fulcrum means from said transverse member being so positioned thereon with respect to each other as to provide substantially static equilibrium of forces with respect to said transverse member when said power means is operated.

22. In a railway car truck, side members and a spring supported transverse member, supporting wheel and axle assemblies, and brake rigging comprising brake beams associated with each assembly, interconnected live and dead truck levers connected to said beams, power means mounted on said transverse member, a cylinder lever fulcrumed from said transverse member and operatively connected between said power means and one of said truck levers, and a connection between the other of said truck levers and said transverse member, the several connections of said parts with said transverse member being so positioned as to provide substantially static equilibrium of said transverse member with respect to forces developed by actuation of said power means for operation of said rigging.

WALTER H. BASELT.